United States Patent [19]

Williams et al.

[11] 4,263,600
[45] Apr. 21, 1981

[54] WIDE-BAND, PHASE SCANNED ANTENNA

[75] Inventors: Frederick C. Williams; Clarence A. Greene, both of Topanga Canyon, Calif.

[73] Assignee: Hughes Aircraft Company, Culver City, Calif.

[21] Appl. No.: 101,593

[22] Filed: Dec. 10, 1979

[51] Int. Cl.³ .............................................. H01Q 3/26
[52] U.S. Cl. .................................................. 343/854
[58] Field of Search ................ 343/100 SA, 777, 778, 343/853, 854

[56] References Cited

U.S. PATENT DOCUMENTS

| 3,806,947 | 4/1974 | Krall et al. | 343/854 |
| 4,166,274 | 8/1979 | Reudink et al. | 343/854 |

Primary Examiner—Eli Lieberman
Attorney, Agent, or Firm—John Holtrichter, Jr.; W. H. MacAllister

[57] ABSTRACT

There is herein described a wide-band, phase scanned transmitting antenna with a greatly reduced bandwidth/scan angle limitation through the use of a time variable phase shifter coupled to the input of each phase scanned sub-array of the antenna.

3 Claims, 4 Drawing Figures

4,263,600

WIDE-BAND, PHASE SCANNED ANTENNA

TECHNICAL FIELD

This invention relates to antennas and more particularly to phase scanned transmitting antennas.

BACKGROUND ART

In the past, it has generally been found necessary to introduce a true time delay phase shift when operating a large, phase scan antenna at wide angles. This holds true when dealing with both standard and compressed or chirped pulses.

The prior art accepted the bandwidth/scan limitations and used the true time delay scanning mechanism when required by bandwidth/scan angle considerations. Although this approach can be made practical in a receive system, it involves considerable cost and complexity in a transmit system where high power RF signals are present.

A more complete description of electronically scanned antennas in general may be had by referring to texts on the subject, one being a book by Peter J. Kahrilas, entitled "Electronic Scanning Radar Systems Design Handbook" published by Artech House, Inc., Dedham, Mass., 1976.

SUMMARY OF THE INVENTION

In view of the foregoing factors and conditions characteristic of the prior art, it is a primary object of the present invention to provide a new and improved wide-band, phase scanned antenna.

Another object of the present invention is to provide a wide-band, phase scanned antenna in which a time variable phase shifter has been added to the input of each phase scanned sub-array of the antenna.

Still another object of the present invention is to provide a wide-band, phase scanned antenna which exhibits a greatly reduced bandwidth/scan angle limitation over that normally associated with a phased array.

Yet another object of the present invention is to provide a transmitting phase scanned antenna utilizing a technique which extends the capability of large, phase scanned transmitting antennas to wider scan angles and/or wider bandwidths than previously possible.

Still a further object of the present invention is to provide a wide-band, phase scanned antenna which incorporates a technique that is particularly applicable to transmitting antennas which use chirped pulses to reduce the peak transmitter power.

Yet a further object of the present invention is to provide a wide-band, phase scanned transmitting antenna which uses a technique that eliminates the necessity for true time delay.

In accordance with an embodiment of the invention, a wide-band, phase scanned antenna for transmitting a chirped pulse RF signal includes a radiating surface with a plurality of phase scanned sub-arrays, each of the sub-arrays being dimensioned to exhibit essentially no time delay error thereacross at the maximum scan angle of the antenna, one of the sub-arrays being a reference sub-array. A plurality of time variable phase shifters is also included, each having an output port coupled to a different one of the sub-arrays and each having a signal input port and a command input port. The invention further includes RF signal distribution circuit means for coupling a chirped pulse RF signal to the signal input port of each of the phase shifters and to the input of the reference sub-array. Coupled to the command input ports of the phase shifters are command means for providing to individual ones of the phase shifters an individual phase control command signal, the phase generated by each individual one of the phase shifters in response to the command signal being initially zero and linearly increasing for the duration of the chirped pulse signal and being proportional to the product of the sine of a desired antenna scan angle times the distance between the centers of a sub-array associated with each individual one of the phase shifters and the reference sub-array, the constant of proportionally being the rate of change of frequency of the chirped pulse RF signal divided by the speed of light.

The command means may include phase shift drivers, and the chirped pulse RF signal to be transmitted may be coupled by the distribution circuit means directly to each phase shifter and the reference sub-array by use of a corporate RF feed system or a traveling wave feed system, for example. Also, the RF signal to be transmitted may be directly coupled to the reference sub-array or through a constant, zero-phase, phase shifter, for example.

The features of the present invention which are believed to be novel are set forth with particularity in the appended claims. The present invention, both as to its organization and manner of operation together with further objects and advantages thereof, may best be understood by making reference to the following description taken in conjunction with the accompanying drawings in which like reference characters refer to like elements in the several views.

DETAILED DESCRIPTION OF THE INVENTION

The invention to be described extends the capability of large, phase scanned transmitting antennas to wider scan angles and/or wider bandwidths than previously possible by providing a time variable phase shifter to the input of phase scanned sub-arrays of the phase scanned antenna. The inventive technique eliminates the prior art use of true time delay in phase scanned antennas transmitting a chirped pulse, where the time delay necessary is small compared to the uncompressed pulse length.

Figure 1:
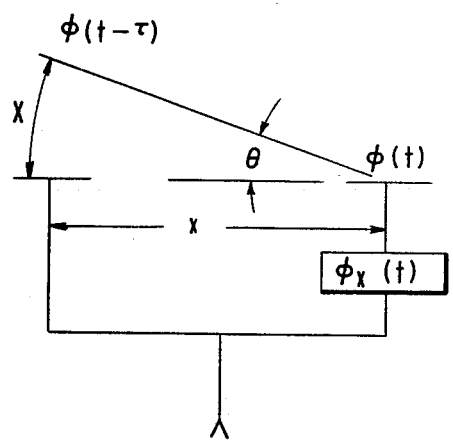
FIG. 1 illustrates the phase correction mechanism of the wide-band, phase scanned antenna in accordance with the present invention.

In accordance with the invention, and referring to FIG. 1, adjacent phase scanned sub-arrays of a phase scanned antenna separated by a distance X, are connected to a normal, center fed feed so that there is no time delay between the two elements. Disposed in series in the feed to the right hand sub-array is a time variable phase shifter. It should be noted that time delay is equivalent to a constant rate-of-change of phase, and this is the principle on which the present invention is based. It will be seen from the following analysis that, except for a pair of transients at the beginning and the end of the uncompressed pulse, a linear rate of change of phase will provide the exact equivalent of time delay.

Referring again to FIG. 1, $X = x\sin\theta$ and the required time delay $\tau = X/c$, where c is the speed of light. The phase function, $\phi(t)$, being radiated is delayed an amount $\tau$ in the left hand element of the figure. The phase correction function, $\phi_x(t)$ must be adjusted so that:

$$\phi(t-\tau) = \phi(t) + \phi_x(t),$$

in order to have a continous phase function across the array in the direction $\theta$. Hence, for any long wide-band pulse, the general form of the phase correction function is:

$$\phi_x(t) = \phi(t-\tau) - \phi(t).$$

For chirp pulses, the phase function, $\phi(t)$, can be written:

$$\phi(t) = \phi_o + \omega_o t + \tfrac{1}{2}\dot\omega t^2,$$

where $\omega_o$ is the carrier and $\dot\omega$ is the frequency slope. From the last two equations, it can be seen that:

$$\phi_x(t) = -\omega_o \tau + \frac{\dot\omega \tau^2}{2} - \dot\omega\tau t.$$

Figure 2:
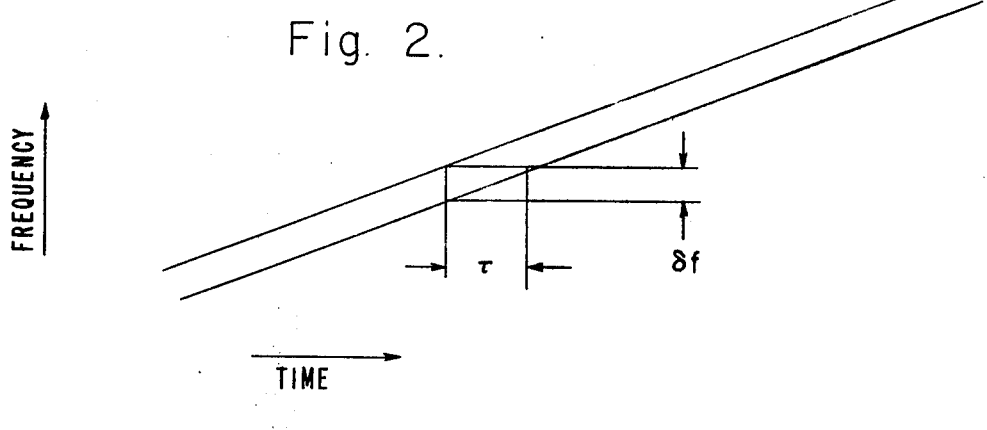
FIG. 2 is a graph of a chirped pulse frequency versus time, in accordance with the invention.

The first term of this equation is of course the normal phase steering term, and the middle term can be explained with reference to FIG. 2. Here, the value of $\tau$ is assumed small compared to the duration of the chirped pulse. Hence, a small fixed $\delta f$ exists between the two radiators contributing to the wave front. This $\delta f$ requires the parabolic correction term $(\dot\omega\tau^2)/2$.

The last term is a constant rate of change, i.e., constant frequency. This term can also be explained with reference to FIG. 2. The second chirp history can be either delayed at time $\tau$ or offset a frequency $\delta f$; the effects are indistinguishable except at the ends. That is, for a chirped pulse, the frequency offset introduced by the constant rate of change of phase is equivalent to a time delay except for an initial and terminal transient.

For most cases of interest, the quadratic term can be ignored. Choose, for example a large antenna, $X = 10$ ft so that $\tau = 10^{-8}$ sec and a large value of $\dot\omega$(500 MHz corresponding to 1 ft resolution in 5μsec). Then $\dot\omega = 2\pi \times 500 \times 10^6/5 \times 10^{-6} = 2\pi \times 10^{14}$ Hz/sec, and $\tfrac{1}{2}\dot\omega\tau^2 = 0.01 \times 2\pi \approx 3.6°$.

In any case, the expression for phase can be written as the sum of a linear and a constant term. The linear term is proportional to the separation between a given element and a reference element. Further, the term is proportional to the sine of the scan angle since, from the above equations, the linear term:

$$\dot\omega t\tau = \frac{\dot\omega \times \sin\theta}{c} t.$$

Figure 3:
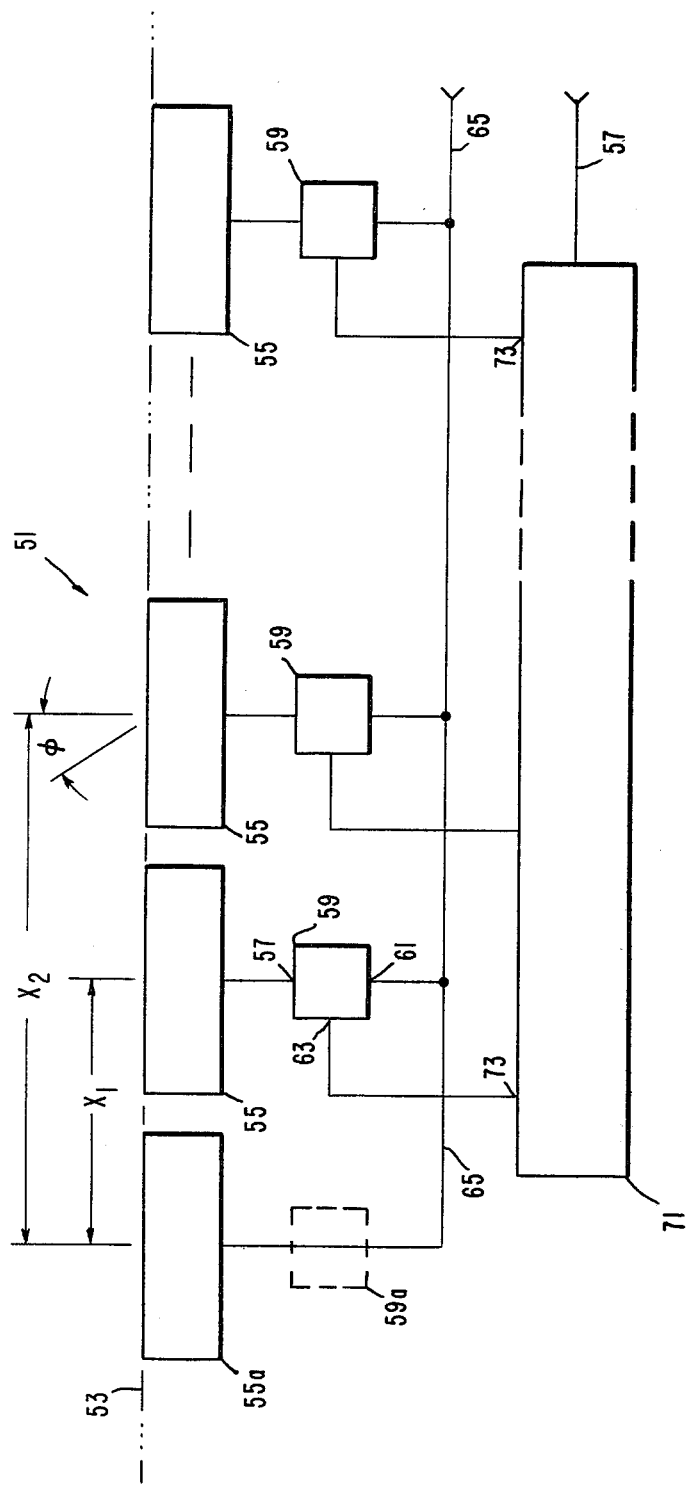
FIG. 3 is a schematic block diagram of the wide-band, phase scanned anntenna according to the invention.

Referring now to FIG. 3, there is shown a wide-band, phase scanned transmitting antenna system 51 having a planar radiating surface 53 comprised of a plurality of conventional phase scanned sub-arrays 55, each sub-array being dimensioned to exhibit essentially no time delay error thereacross at the maximum design scan angle of the antenna. All but one of the sub-arrays (reference sub-array 55a) are coupled to the output ports 57 of associated time variable phase shifters 59, each of these phase shifters having a signal input port 61 and a command input port 63.

Coupled to the signal input ports 61 and to the input port of the reference sub-array 55a is an RF signal distributing circuit 65 which couples a chirped pulse RF signal to the antenna system 51. The invention also includes a phase command circuit 71 having output terminals 73, each coupled to the command input port 63 of a different one of the time variable phase shifters 59. The phase command circuit 71 may be advantageously digitally implemented to provide to the individual phase shifters 59 an individual phase control command signal which causes the phase shifters to produce an initially zero phase shift output which linearly increases for the duration of the chirped pulse signal. This phase shift output is proportional to the product of the sine of a desired antenna scan angle, $\theta$, times the distance, X, between the centers of a particular sub-array 55 and the reference sub-array 55a, the constant of proportionality being the frequency slope of the chirped pulse RF signal, $\dot\omega$, divided by the speed of light. Parameters such as the desired scan angle, $\theta$, the chirp pulse start time, $t_0$, and $\dot\omega$, may be coupled to the phase command circuit by means of an input port or ports 75.

Where it is more convenient to provide phase shifters 59 for all sub-arrays 55, including the references sub-array 55a, phase shifter 59a which is preset to produce a constant zero phase shift, may be utilized.

Figure 4:
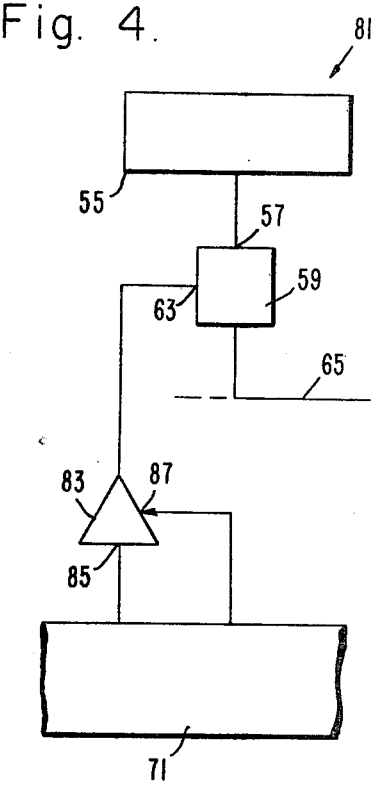
FIG. 4 is a portion of a block diagram showing a different embodiment of the present invention.

In accordance with another embodiment 81 of the present invention, shown in FIG. 4, where TTL phase command signals are provided from the phase command circuit 71, they may be coupled to conventional phase shift drivers 83. Here, a sawtooth signal is coupled to first ports 85, while the signal proportional to the sine of the scan angle times the element separation from the reference element is provided to the drivers from the phase command circuit 71 to second ports 87 of the drivers. The results of this operation is a phase shift, linearly increasing in time, proportional to the sine of the desired scan angle and the spacing between the sub-array 55 and the reference sub-array 55a.

From the foregoing it should be clear that there has been described a new and improved wide-band, phase scanned system which utilizes a novel technique for substituting true time delay in a transmit antenna with a time variable phase shifter. As noted previously, this technique may be advantageously utilized for chirped transmit waveforms where the uncompressed pulse length is large compared to the required true time delay. It should be pointed out that although the RF signal distribution circuit 65 may be a corporate feed, this in not necessary since additional delays inderent in a traveling wave feed could be corrected out as well by the technique.

What is claimed is:

1. A wide-band, phase scanned antenna for transmitting a chirped pulse RF signal at a desired scan angle from broadside, comprising:
   a plurality of phase scanned sub-arrays, each being dimensioned to exhibit essentially no time delay error thereacross at the maximum scan angle of said antenna, one of said sub-arrays being a reference sub-array;
   a plurality of time variable phase shifters, each having an output port coupled to a different one of said sub-arrays, and each having a signal input port and a command input port;

RF signal distribution circuit means for coupling a chirp pulsed RF signal to said signal phase shifters and to said reference sub-array; and pulse command means coupled to said command input ports of said phase shifters for providing to individual ones of said phase shifters an individual phase control command signal, the phase generated by each individual one of said phase shifters in response to said command signal being initially zero and linearly increasing for the duration of said chirped pulse RF signal and being proportional to the product of the sine of a desired antenna scan angle times the distance between the centers of a sub-array associated with each individual one of said phase shifters and said reference sub-array, the constant of proportionality being the frequency slope of said chirped pulse RF signal divided by the speed of light.

2. The wide-band, phase scanned antenna according to claim 1, wherein said RF signal distribution circuit means couples said chirp pulsed RF signal through one of said phase shifters to said reference sub-array, said one of said phase shifters producing constant zero phase shift.

3. The wide-band, phase scanned antenna according to claim 1, also comprising phase shift drivers each coupled to a command input port of a different one of said phase shifters, said pulse command means being coupled to said command input ports of said phase shifters through said phase shift drivers.

* * * * *